(12) United States Patent
Guo et al.

(10) Patent No.: US 12,116,275 B2
(45) Date of Patent: Oct. 15, 2024

(54) METHOD FOR PREPARING BATTERY-GRADE ANHYDROUS IRON PHOSPHATE FROM LIQUID CRUDE MONOAMMONIUM PHOSPHATE

(71) Applicant: Sichuan University, Chengdu (CN)

(72) Inventors: Xiaodong Guo, Chengdu (CN); Zhenguo Wu, Chengdu (CN); Yang Song, Chengdu (CN); Tongli Liu, Chengdu (CN); Fa He, Chengdu (CN); Meng Xiao, Chengdu (CN)

(73) Assignee: Sichuan University, Chengdu (CN)

( * ) Notice: Subject to any disclaimer, the term of this patent is extended or adjusted under 35 U.S.C. 154(b) by 0 days.

(21) Appl. No.: 18/111,917

(22) Filed: Feb. 21, 2023

(65) Prior Publication Data

US 2024/0101424 A1    Mar. 28, 2024

(30) Foreign Application Priority Data

Feb. 22, 2022    (CN) .......................... 202210160054.9

(51) Int. Cl.
    *C01B 25/37*      (2006.01)
    *C01B 25/46*      (2006.01)

(52) U.S. Cl.
    CPC .......... *C01B 25/375* (2013.01); *C01B 25/468* (2013.01); *C01P 2002/72* (2013.01); *C01P 2004/03* (2013.01); *C01P 2006/40* (2013.01)

(58) Field of Classification Search
None
See application file for complete search history.

(56) References Cited

U.S. PATENT DOCUMENTS

| | | | |
|---|---|---|---|
| 2011/0068295 A1* | 3/2011 | Beck | C01B 25/375 |
| | | | 423/311 |
| 2013/0062289 A1 | 3/2013 | Cote et al. | |

(Continued)

FOREIGN PATENT DOCUMENTS

| | | |
|---|---|---|
| CN | 109368612 A | 2/2019 |
| CN | 112624077 A | 4/2021 |

OTHER PUBLICATIONS

Lou et al. CN109368612; translation provided by GooglePatents Feb. 29, 2024.*

(Continued)

*Primary Examiner* — Guinever S Gregorio
(74) *Attorney, Agent, or Firm* — Hemisphere Law, PLLC; Zhigang Ma

(57) ABSTRACT

The present invention provides a method for preparing battery-grade anhydrous iron phosphate from liquid crude monoammonium phosphate, and belongs to the technical field of chemical industry production. In the present invention, ferrous sulfate solution and liquid crude monoammonium phosphate are used as raw materials, and ferrous iron is oxidized to ferric iron and separates out iron phosphate precipitate under the action of an oxidizing agent to obtain iron phosphate intermediate slurry; and then battery-grade anhydrous iron phosphate is finally obtained through solid-liquid separation, washing, aging, solid-liquid separation, washing, drying, dehydration and breaking up. The method provided by the present invention realizes the resource utilization of liquid crude monoammonium phosphate, has simple process and convenient operation and produces less waste water.

6 Claims, 2 Drawing Sheets

(56) References Cited

U.S. PATENT DOCUMENTS

2018/0097228 A1    4/2018  Tan et al.
2019/0322596 A1  10/2019  Botha

OTHER PUBLICATIONS

CNIPA, Notification of First Office Action for Chinese application CN202210160054.9, Aug. 5, 2022.
CNIPA, Notification to grant patent right for Chinese application CN202210160054.9, Oct. 13, 2022.

\* cited by examiner

METHOD FOR PREPARING BATTERY-GRADE ANHYDROUS IRON PHOSPHATE FROM LIQUID CRUDE MONOAMMONIUM PHOSPHATE

TECHNICAL FIELD

The present invention relates to the technical field of chemical industry production, and particularly relates to a method for preparing battery-grade anhydrous iron phosphate from liquid crude monoammonium phosphate.

BACKGROUND

Battery-grade anhydrous iron phosphate is the core precursor to produce lithium iron phosphate as the cathode material of lithium batteries. The lithium iron phosphate battery has the advantages of low cost, good safety performance, multiple charging and discharging times, environmental protection, extensive sources of resources, good stability and no toxicity, and has a good development prospect. Phosphoric acid or high-purity monoammonium phosphate is the main phosphorus source for the production of battery-grade anhydrous iron phosphate at present, and the cost per ton of product is high, which is disadvantageous to industrial development.

At present, a large amount of intermediate product, liquid crude monoammonium phosphate, will be produced in the production process of ammonium phosphate. Compared with industrial-grade solid monoammonium phosphate, liquid crude monoammonium phosphate contains more impurities such as Si, S, F, Na and Mg. How to realize the resource utilization of liquid crude monoammonium phosphate is a technical problem to be solved at present.

SUMMARY

The purpose of the present invention is to provide a method for preparing battery-grade anhydrous iron phosphate from liquid crude monoammonium phosphate. In the present invention, ferrous sulfate solution and liquid crude monoammonium phosphate are used as raw materials, and battery-grade anhydrous iron phosphate can be finally obtained, realizing the resource utilization of liquid crude monoammonium phosphate.

To achieve the above purpose of the present invention, the present invention provides the following technical solution:

The present invention provides a method for preparing battery-grade anhydrous iron phosphate from liquid crude monoammonium phosphate, comprising the following steps:

(1) Preheating ferrous sulfate solution to obtain the preheated ferrous sulfate solution;
(2) Mixing the preheated ferrous sulfate solution, liquid crude monoammonium phosphate and hydrogen peroxide solution for oxidation reaction to obtain iron phosphate intermediate slurry;
(3) Conducting solid-liquid separation of the iron phosphate intermediate slurry, and washing the obtained solid material to obtain crude iron phosphate;
(4) Mixing the crude iron phosphate, water and phosphoric acid, and then aging to obtain aged slurry,
(5) Conducting solid-liquid separation of the aged slurry, and washing, drying, dehydrating and breaking up the obtained solid material in sequence to obtain battery-grade anhydrous iron phosphate.

Preferably, the ferrous sulfate solution in step (1) is pre-purified ferrous sulfate solution with the pH value of 1.8-2.0, the mass content of iron is 5%-7%, the content of Ti is less than 20 ppm, the content of Mg is less than 3000 ppm, and the content of Mn is less than 500 ppm.

Preferably, the temperature of the preheating in step (1) is 40-70° C.

Preferably, the molar ratio of iron in the preheated ferrous sulfate solution to phosphorus in the liquid crude monoammonium phosphate in step (2) is 1:(0.9-1.2), and the mass fraction of monoammonium phosphate in the liquid crude monoammonium phosphate is 18%-30%.

Preferably, the molar ratio of hydrogen peroxide in the hydrogen peroxide solution to iron in the preheated ferrous sulfate solution in step (2) is (0.6-0.8):1, and the mass fraction of the hydrogen peroxide solution is 20%-30%.

Preferably, the mixing method in step (2) comprises: adding liquid crude monoammonium phosphate and hydrogen peroxide solution to the preheated ferrous sulfate solution, the time for adding the liquid crude monoammonium phosphate is 50-70 min, the time for adding the hydrogen peroxide solution is 50-70 min, and the time for adding the hydrogen peroxide solution is 1-5 min later than the time for adding the liquid crude monoammonium phosphate.

Preferably, the temperature of the oxidation reaction in step (2) is 40-70° C., and the time is 40-100 min.

Preferably, the mass fraction of the phosphoric acid in step (4) is 50%-90%, and the phosphoric acid is added so that the molar ratio of iron to phosphorus in a system obtained by mixing the crude iron phosphate, water and phosphoric acid is 1:(1.00-1.15).

Preferably, the temperature of the aging in step (4) is 75-95° C., and the time is 1-5 h.

Preferably, the temperature of drying in step (5) is 60-160° C., and the time of the drying is so that the moisture content of the obtained material after drying is less than or equal to 10 wt %; and the temperature of the dehydration is 550-700° C., and the time is 2-7 h.

The present invention provides a method for preparing battery-grade anhydrous iron phosphate from liquid crude monoammonium phosphate, comprising the following steps: (1) preheating ferrous sulfate solution to obtain the preheated ferrous sulfate solution; (2) mixing the preheated ferrous sulfate solution, liquid crude monoammonium phosphate and hydrogen peroxide solution for oxidation reaction to obtain iron phosphate intermediate slurry; (3) conducting solid-liquid separation of the iron phosphate intermediate slurry, and washing the obtained solid material to obtain crude iron phosphate; (4) mixing the crude iron phosphate, water and phosphoric acid, and then aging to obtain aged slurry, (5) conducting solid-liquid separation of the aged slurry, and washing, drying, dehydrating and breaking up the obtained solid material in sequence to obtain battery-grade anhydrous iron phosphate. In the present invention, ferrous sulfate solution and liquid crude monoammonium phosphate are used as raw materials, and ferrous iron is oxidized to ferric iron and separates out iron phosphate precipitate under the action of an oxidizing agent to obtain iron phosphate intermediate slurry. Then battery-grade anhydrous iron phosphate is finally obtained through solid-liquid separation, washing, aging, solid-liquid separation, washing, drying, dehydration and breaking up. The method provided by the present invention realizes the resource utilization of liquid crude monoammonium phosphate, has simple process and convenient operation, produces less waste water, and only consumes 30 tons of deionized water for each ton of battery-grade anhydrous iron phosphate product, and the production cost is low; and the method has high product purity and strong batch stability, and is suitable for large-scale production.

DETAILED DESCRIPTION

Figure 1:
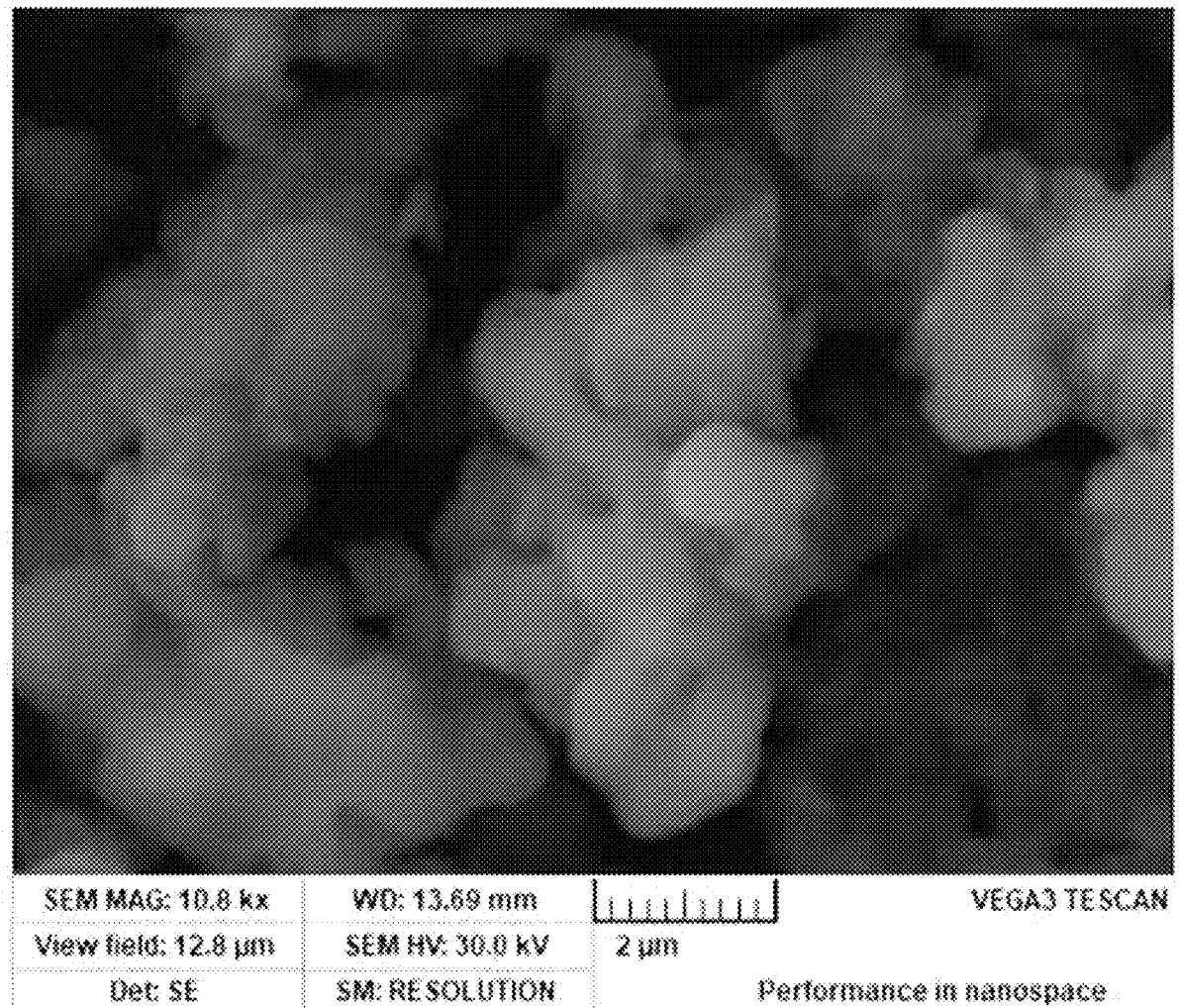
FIG. 1 is an SEM diagram of battery-grade anhydrous iron phosphate prepared in embodiment 1.

The present invention provides a method for preparing battery-grade anhydrous iron phosphate from liquid crude monoammonium phosphate, comprising the following steps:

(1) Preheating ferrous sulfate solution to obtain the preheated ferrous sulfate solution;

(2) Mixing the preheated ferrous sulfate solution, liquid crude monoammonium phosphate and hydrogen peroxide solution for oxidation reaction to obtain iron phosphate intermediate slurry;

(3) Conducting solid-liquid separation of the iron phosphate intermediate slurry, and washing the obtained solid material to obtain crude iron phosphate;

(4) Mixing the crude iron phosphate, water and phosphoric acid, and then aging to obtain aged slurry;

(5) Conducting solid-liquid separation of the aged slurry, and washing, drying, dehydrating and breaking up the obtained solid material in sequence to obtain battery-grade anhydrous iron phosphate.

In the present invention, the ferrous sulfate solution is preheated to obtain the preheated ferrous sulfate solution. In the present invention, the mass content of iron in the ferrous sulfate solution is preferably 5%-7%, and the pH value of the ferrous sulfate solution is preferably 1.8-2.0. In the present invention, the ferrous sulfate solution is preferably pre-purified ferrous sulfate solution; and specifically, the pH value of the pre-purified ferrous sulfate solution is preferably 1.8-2.0, the mass fraction of iron is preferably 5%-7%, the content of Ti is preferably less than 20 ppm, the content of Mg is preferably less than 3000 ppm, and the content of Mn is preferably less than 500 ppm. The present invention has no special restriction on the specific purification method of the pre-purified ferrous sulfate solution, and the method known by those skilled in the art can be used. In the present invention, the temperature of the preheating is preferably 40-70° C. and more preferably 50-60° C.

After the preheated ferrous sulfate solution is obtained, the preheated ferrous sulfate solution, liquid crude monoammonium phosphate and hydrogen peroxide solution are mixed for oxidation reaction to obtain iron phosphate intermediate slurry. In the present invention, the liquid crude monoammonium phosphate is specifically an intermediate product in the production process of ammonium phosphate; the mass fraction of the liquid crude monoammonium phosphate is preferably 18%-30% and more preferably 20%-22%; and the molar ratio of iron in the preheated ferrous sulfate solution to phosphorus in the liquid crude monoammonium phosphate is preferably 1:(0.9-1.2) and more preferably 1:(0.96-1.10). In the present invention, the mass fraction of the hydrogen peroxide solution is preferably 20%-30% and more preferably 28%; and the molar ratio of hydrogen peroxide in the hydrogen peroxide solution to iron in the preheated ferrous sulfate solution is preferably (0.6-0.8):1 and more preferably (0.65-0.75):1.

In the present invention, the method for mixing the preheated ferrous sulfate solution, liquid crude monoammonium phosphate and hydrogen peroxide solution comprises: adding liquid crude monoammonium phosphate and hydrogen peroxide solution to the preheated ferrous sulfate solution, the time for adding the liquid crude monoammonium phosphate is preferably 30-70 min and more preferably 45-60 min; the time for adding the hydrogen peroxide solution is preferably 30-70 min and more preferably 60 min; and the time for adding the hydrogen peroxide solution is preferably 1-5 min later than the time for adding the liquid crude monoammonium phosphate and more preferably 2 min.

In the present invention, the temperature of the oxidation reaction is preferably 40-70° C. and more preferably 50-60° C.; the time of the oxidation reaction is preferably 40-100 min and more preferably 60-75 min; in the present invention, oxidation reaction occurs in the system as soon as the hydrogen peroxide solution is added, and to ensure the completion of the reaction, after the hydrogen peroxide solution is added, the oxidation reaction is continued for preferably 10-30 min and more preferably 15-20 min; and the time of the oxidation reaction described in the present invention specifically refers to the time for adding the hydrogen peroxide solution and the total time for continuing the reaction after the hydrogen peroxide solution is added. In the present invention, the addition of the liquid crude monoammonium phosphate and hydrogen peroxide solution and the oxidation reaction are preferably conducted under the stirring condition, and the stirring speed is preferably 400-1200 rpm and more preferably 600 rpm; and in embodiments of the present invention, a high speed shearer is used as an agitator to provide the stirring condition. In the present invention, the liquid crude monoammonium phosphate and the hydrogen peroxide solution separate out iron phosphate precipitate to form iron phosphate intermediate slurry in the oxidation process.

After being obtained, the iron phosphate intermediate slurry is subjected to solid-liquid separation, and the obtained solid material is washed to obtain crude iron phosphate. The present invention has no special restriction on the solid-liquid separation method, and the solid-liquid separation method known by those skilled in the art, for example, filter pressing, can be used. In the present invention, the washing is preferably repulping washing, and the number of times of the repulping washing is preferably three, which are recorded as one-stage first repulping washing, one-stage second repulping washing and one-stage third repulping washing in sequence; specifically, the iron phosphate intermediate slurry is subjected to filter pressing to obtain a filter cake and a one-stage mother solution, and the moisture content of the filter cake is preferably less than or equal to 60 wt %; the filter cake is subjected to one-stage first repulping washing to obtain a one-stage first washing filter cake and a one-stage first washing solution through first filter pressing, and the moisture content of the one-stage first washing filter cake is preferably less than or equal to 60 wt %; the one-stage first washing filter cake is subjected to one-stage second repulping washing to obtain a one-stage second washing filter cake and a one-stage second washing solution through second filter pressing, and the moisture content of the one-stage second washing filter cake is preferably less than or equal to 60 wt %; the one-stage second washing filter cake is subjected to one-stage third repulping washing to obtain a one-stage third washing filter cake and a one-stage third washing solution through third filter pressing, the moisture content of the one-stage third washing filter cake is preferably less than or equal to 60 wt %, and the one-stage third washing filter cake is the crude iron phosphate; and the concentration of sulfate in the one-stage third washing solution is preferably controlled to be less than or equal to 8000 ppm in the present invention. To reduce the production cost and realize the full utilization of the washing solutions, solutions produced in subsequent steps are preferably subjected to the one-stage first repulping washing, one-stage second repulping washing and one-stage third repulping washing as washing solutions in the present invention (for initial production, the above solutions are replaced by an equal amount of deionized water for washing in the present invention); specifically, the washing solution used in the one-stage first repulping washing is preferably a two-stage mother solution, and the mass ratio of the two-stage mother solution to the filter cake is preferably (2-2.3):1; and the washing solution used in the one-stage second repulping washing is preferably a two-stage first washing solution, the washing solution used in the one-stage third repulping washing is preferably a two-stage second washing solution, and the mass ratio of the two-stage first washing solution to the two-stage second washing solution to the filter cake is independently preferably (3.8-4.2):1. The sources of the two-stage mother solution, the two-stage first washing solution and the two-stage second washing solution will be described below in detail in the present invention.

After the crude iron phosphate is obtained, the crude iron phosphate, water and phosphoric acid are mixed and then aged to obtain aged slurry. In the present invention, the mass fraction of the phosphoric acid is preferably 50%-90% and more preferably 85%, and specifically, the phosphoric acid is industrial-grade phosphoric acid with the mass fraction of 85%; and the water is preferably deionized water. In the present invention, the phosphoric acid is added so that the molar ratio of iron to phosphorus in a system obtained by mixing the crude iron phosphate, water and phosphoric acid is preferably 1:(1.00-1.15) and more preferably 1:(1.08-1.12). The crude iron phosphate, water and phosphoric acid are mixed by high speed stirring, and the stirring speed is preferably 800-2000 rpm and more preferably 800-1200 rpm; and slurry to be aged with the pH value of 1.0-2.0 is obtained after mixing. In the present invention, the temperature of the aging is preferably 75-95° C. and more preferably 85-95° C.; the time is preferably 1-5 h and more preferably 2.5-3.5 h; and the aging is preferably conducted under the stirring condition, and the stirring speed is preferably 80-120 rpm and more preferably 100 rpm.

After being obtained, the aged slurry is subjected to solid-liquid separation, and the obtained solid material is washed, dried, dehydrated and broken up in sequence to obtain battery-grade anhydrous iron phosphate. The present invention has no special restriction on the solid-liquid separation method, and the solid-liquid separation method known by those skilled in the art, for example, filter pressing, can be used. In the present invention, the washing is preferably repulping washing, and the number of times of the repulping washing is preferably three, which are recorded as two-stage first repulping washing, two-stage second repulping washing and two-stage third repulping washing in sequence; specifically, the aged slurry is subjected to filter pressing to obtain an aged filter cake and a two-stage mother solution, and the moisture content of the aged filter cake is preferably less than or equal to 60 wt %; the aged filter cake is subjected to two-stage first repulping washing to obtain a two-stage first washing filter cake and a two-stage first washing solution through first filter pressing, and the moisture content of the two-stage first washing filter cake is preferably less than or equal to 60 wt %; the two-stage first washing filter cake is subjected to two-stage second repulping washing to obtain a two-stage second washing filter cake and a two-stage second washing solution through second filter pressing, and the moisture content of the two-stage second washing filter cake is preferably less than or equal to 60 wt %; and the two-stage second washing filter cake is subjected to two-stage third repulping washing to obtain a two-stage third washing filter cake and a two-stage third washing solution through third filter pressing, the moisture content of the two-stage third washing filter cake is preferably less than or equal to 60 wt %, and the two-stage third washing filter cake is subsequently dried. In the present invention, to reduce the production cost and realize the full utilization of the washing solutions, the washing solution used in the two-stage first repulping washing is preferably a two-stage third washing solution, and the mass ratio of the two-stage third washing solution to the filter cake is preferably (3.8-4.2):1; in the present invention, the washing solutions used in the two-stage second repulping washing and two-stage third repulping washing are preferably water and more preferably deionized water; and the mass ratio of water (or deionized water) used in the two-stage second repulping washing and two-stage third repulping washing to the filter cake is independently preferably (3.8-4.2):1.

In the present invention, the temperature of the drying is preferably 60-160° C. and more preferably 80-120° C.; the time of the drying is so that the moisture content of the obtained material after drying is less than or equal to 10 wt % and more preferably 2-8 wt %; the temperature of the dehydration is preferably 550-700° C. and more preferably 600-650° C.; and the time of the dehydration is preferably 2-7 h and more preferably 3-5 h. In the present invention, the breaking up is preferably to control the particle diameter of the material to be D50 of 2-6 μm.

The technical solution in the present invention will be clearly and fully described below in combination with embodiments in the present invention. Apparently, the described embodiments are merely part of the embodiments of the present invention, not all of the embodiments. Based on the embodiments in the present invention, all other embodiments obtained by those ordinary skilled in the art without contributing creative labor will belong to the protection scope of the present invention.

Embodiment 1

Battery-grade anhydrous iron phosphate is prepared in the specific steps as follows:
(1) Providing pre-purified ferrous sulfate solution and liquid crude monoammonium phosphate;
The pH value of the pre-purified ferrous sulfate solution is 1.82, the mass fraction of iron is 5.66%, the content of Ti is less than 20 ppm, the content of Mg is less than 3000 ppm, and the content of Mn is less than 500 ppm;
The mass fraction of monoammonium phosphate in the liquid crude monoammonium phosphate is 28.67%; and the liquid crude monoammonium phosphate is an intermediate product in the production process of ammonium phosphate;
(2) Preheating 3000 kg of pre-purified ferrous sulfate solution to 60° C. to obtain the preheated ferrous sulfate solution; at the stirring rate of 600 rpm, adding 1180.6 kg of liquid crude monoammonium phosphate to the preheated ferrous sulfate solution at a constant speed, wherein the time for adding the liquid crude monoammonium phosphate is 60 min; after adding the liquid crude monoammonium phosphate for 2 min, adding 241.5 kg of hydrogen peroxide solution with the mass fraction of 28% to the obtained system at a constant speed, wherein the time for adding the hydrogen peroxide solution is 60 min; and after adding the liquid crude monoammonium phosphate and hydrogen peroxide solution, continuing the reaction at 60° C. for 15 min to obtain iron phosphate intermediate slurry;

(3) Conducting filter pressing of the iron phosphate intermediate slurry to obtain a one-stage mother solution and a filter cake with the moisture content of 60 wt %; with a subsequent two-stage mother solution (3390 kg) in step (5) as the washing solution, conducting one-stage first repulping washing of the filter cake to obtain a one-stage first washing solution and a one-stage first washing filter cake with the moisture content of 60 wt % through first filter pressing; with a subsequent two-stage first washing solution (5685 kg) in step (5) as the washing solution, conducting one-stage second repulping washing of the one-stage first washing filter cake to obtain a one-stage second washing solution and a one-stage second washing filter cake with the moisture content of 60 wt % through second filter pressing; with a subsequent two-stage second washing solution (5685 kg) in step (5) as the washing solution, conducting one-stage third repulping washing of the one-stage second washing filter cake to obtain a one-stage third washing solution (with the sulfate concentration of 6860 ppm) and a one-stage third washing filter cake with the moisture content of 60 wt % through third filter pressing, wherein the one-stage third washing filter cake is crude iron phosphate;

(4) Stirring and breaking up the crude iron phosphate, 3354 kg of deionized water and 31.27 kg of industrial phosphoric acid with the mass fraction of 85% under the condition of 800 rpm, and the pH value of slurry to be aged is 1.80 at this moment; and then aging under the conditions of 100 rpm and 90° C. for 2.5 h to obtain aged slurry;

(5) Conducting filter pressing of the aged slurry to obtain a two-stage mother solution and an aged filter cake with the moisture content of 60 wt %; with a subsequent two-stage third washing solution (60 kg) as the washing solution, conducting two-stage first repulping washing of the aged filter cake to obtain a two-stage first washing solution and a two-stage first washing filter cake with the moisture content of 60 wt % through first filter pressing; with deionized water (5685 kg) as the washing solution, conducting two-stage second repulping washing of the two-stage first washing filter cake to obtain a two-stage second washing solution and a two-stage second washing filter cake with the moisture content of 60 wt % through second filter pressing; with deionized water (5685 kg) as the washing solution, conducting two-stage third repulping washing of the two-stage second washing filter cake to obtain a two-stage third washing solution and a two-stage third washing filter cake with the moisture content of 60 wt % through third filter pressing; and drying the two-stage third washing filter cake at 120° C. for 6 h, dehydrating at 650° C. for 3 h, and then breaking up to D50 of 2.91 μm to obtain battery-grade anhydrous iron phosphate.

After tests, the contents of Mg and S in the battery-grade anhydrous iron phosphate prepared in the embodiment are both less than 50 ppm, and the contents of other impurity elements such as Zn, Mn, Al, Ni, Ti and Cr are all less than 20 ppm.

FIG. 1 is an SEM diagram of battery-grade anhydrous iron phosphate prepared in embodiment 1, and it can be seen from FIG. 1 that battery-grade anhydrous iron phosphate prepared in embodiment 1 has primary particles obviously fused and secondary agglomerated particles in a porous state and is an ideal precursor for lithium iron phosphate batteries.

Figure 2:
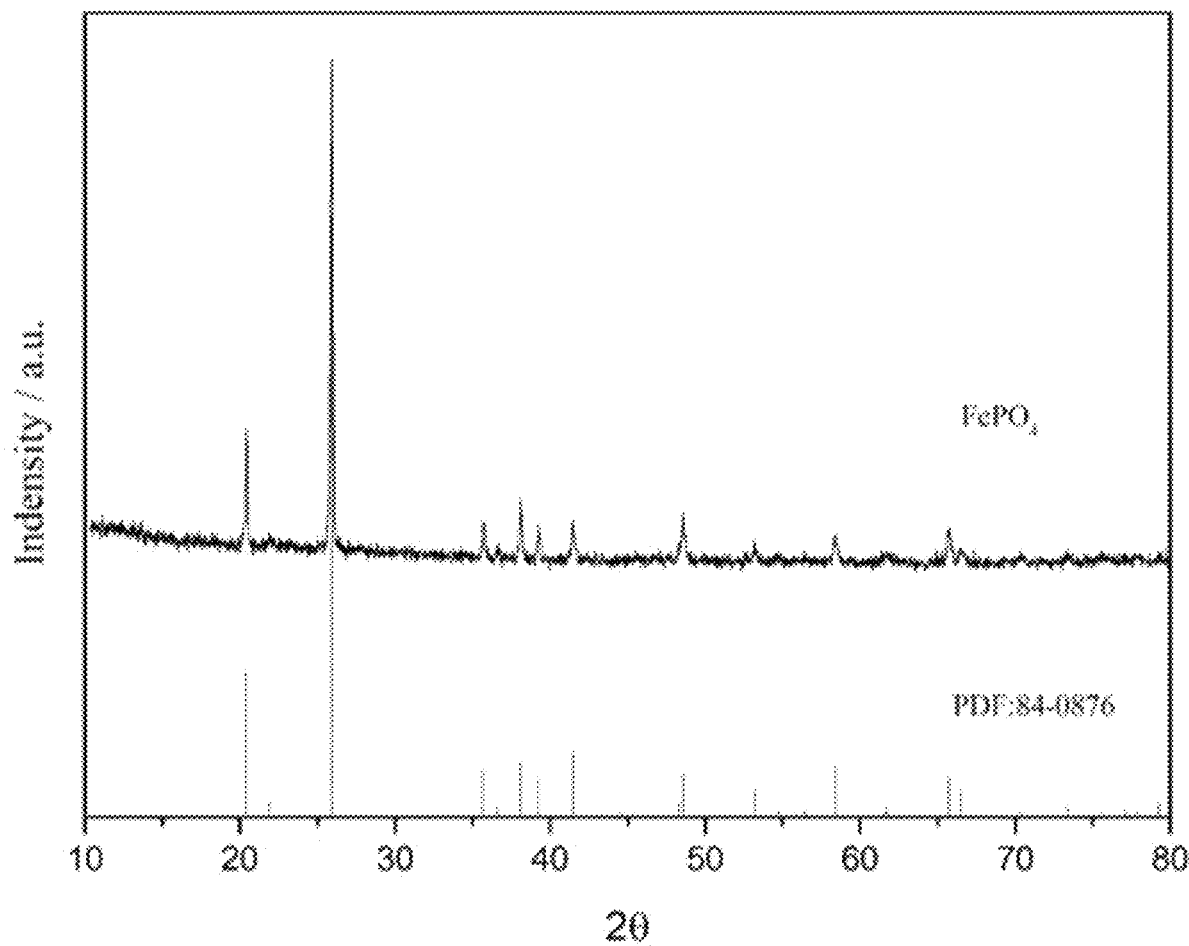
FIG. 2 is an XRD diagram of battery-grade anhydrous iron phosphate prepared in embodiment 1.

FIG. 2 is an XRD diagram of battery-grade anhydrous iron phosphate prepared in embodiment 1, and it can be seen from FIG. 2 that battery-grade anhydrous iron phosphate prepared in embodiment 1 has no obvious miscellaneous peak, and the strongest peak is 2θ=25.906, with the peak strength of 2767 and the half peak width of B=0.180, indicating that the battery-grade anhydrous iron phosphate is high-purity anhydrous iron phosphate.

The above descriptions are only preferred embodiments of the present invention. It should be noted that, for those ordinary skilled in the art, many improvements and polishes may be made without departure from the technical principles of the present invention, and these improvements and polishes should also be deemed to be fallen into the protection scope of the present invention.

What is claimed is:

1. A method for preparing battery-grade anhydrous iron phosphate from liquid crude monoammonium phosphate, comprising the following steps:
   S1. preheating ferrous sulfate solution to obtain the preheated ferrous sulfate solution;
   S2. mixing the preheated ferrous sulfate solution, liquid crude monoammonium phosphate and hydrogen peroxide solution for oxidation reaction to obtain iron phosphate intermediate slurry; the molar ratio of iron in the preheated ferrous sulfate solution to phosphorus in the liquid crude monoammonium phosphate is 1:(0.9-1.2), the mass fraction of monoammonium phosphate in the liquid crude monoammonium phosphate is 18%-30%, and the liquid crude monoammonium phosphate is an intermediate product in the production process of ammonium phosphate; and the temperature of the oxidation reaction is 40-60° C., and the time is 40-100 min;
   wherein the mixing method in step (2) comprises: adding liquid crude monoammonium phosphate and hydrogen peroxide solution to the preheated ferrous sulfate solution, the time for adding the liquid crude monoammonium phosphate is 50-70 min, the time for adding the hydrogen peroxide solution is 50-70 min, and the time for adding the hydrogen peroxide solution is 1-5 min later than the time for adding the liquid crude monoammonium phosphate;
   S3. conducting solid-liquid separation of the iron phosphate intermediate slurry, and washing the obtained solid material to obtain crude iron phosphate;
   S4. mixing the crude iron phosphate, water and phosphoric acid, and then aging to obtain aged slurry, wherein the temperature of the aging is 75-95° C., and the time is 1-2.5 h;
   S5. conducting solid-liquid separation of the aged slurry, and washing, drying, dehydrating and breaking up the obtained solid material in sequence to obtain battery-grade anhydrous iron phosphate.

2. The method according to claim 1, wherein the ferrous sulfate solution in step (1) is pre-purified ferrous sulfate solution with the pH value of 1.8-2.0, the mass content of iron is 5%-7%, the content of Ti is less than 20 ppm, the content of Mg is less than 3000 ppm, and the content of Mn is less than 500 ppm.

3. The method according to claim 1, wherein the temperature of the preheating in step (1) is 40-70° C.

4. The method according to claim 1, wherein the molar ratio of hydrogen peroxide in the hydrogen peroxide solution to iron in the preheated ferrous sulfate solution in step (2) is (0.6-0.8):1, and the mass fraction of the hydrogen peroxide solution is 20%-30%.

5. The method according to claim 1, wherein the mass fraction of the phosphoric acid in step (4) is 50%-90%, and the phosphoric acid is added so that the molar ratio of iron to phosphorus in a system obtained by mixing the crude iron phosphate, water and phosphoric acid is 1:(1.00-1.15).

6. The method according to claim 1, wherein the temperature of the drying in step (5) is 60-160° C., and the time of the drying is so that the moisture content of the obtained material after drying is less than or equal to 10 wt %; and the temperature of the dehydration is 550-700° C., and the time is 2-7 h.

* * * * *